J. H. McCORMICK.
DRAW GEAR AND BUFFING APPARATUS.
APPLICATION FILED MAR. 8, 1913.
1,127,658.
Patented Feb. 9, 1915.
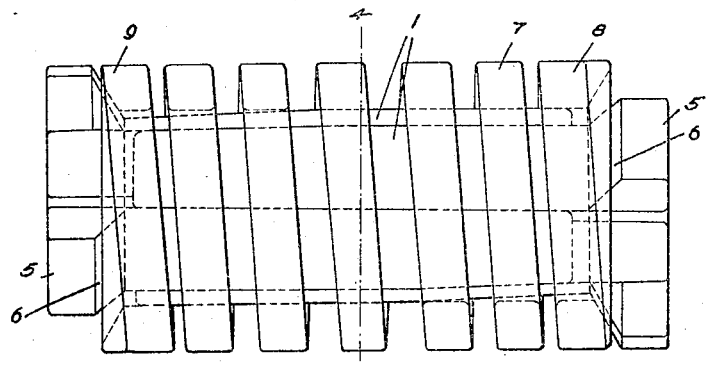
Fig. 1
Fig. 2
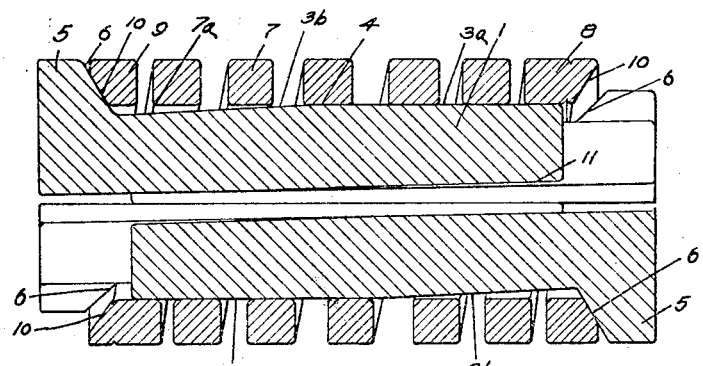
Fig. 3
Fig. 4
Inventor
John H. McCormick
Witnesses
L. W. Frost
A. L. Phelps
By C. C. Shepherd
Attorney

UNITED STATES PATENT OFFICE.

JOHN H. McCORMICK, OF BEXLEY, OHIO.

DRAW-GEAR AND BUFFING APPARATUS.

1,127,658.   Specification of Letters Patent.   Patented Feb. 9, 1915.

Application filed March 8, 1913. Serial No. 752,918.

*To all whom it may concern:*

Be it known that I, JOHN H. McCORMICK, a citizen of the United States, residing at Bexley, in the county of Franklin and State of Ohio, have invented certain new and useful Improvements in Draw-Gear and Buffing Apparatus, of which the following is a specification.

My invention relates to draw gear and buffing apparatus and aims particularly to produce a device of this character that is extremely efficient and in which there is used a minimum number of parts.

One object of my invention is to produce a draft gear comprising a plurality of friction members interacting to produce their own wedging action by the use of a spring, which spring is preferably of a nature to be unyielding laterally. This spring, which normally maintains the friction members in their release position, may also be provided with friction faces bearing directly upon the friction members, in which case the effect of a casing usually used to envelop the friction members is gotten and at the same time, the casing members proper are dispensed with, as well as the usual form of wedging devices.

In order to make the wedging faces active and at the same time to make the release more certain, it is desirable to slightly taper the friction members to give the required wedging action when they are compressed. Inasmuch as the spring itself replaces the casing, it becomes necessary that the spring itself be somewhat tapered, at least when partially or wholly compressed. In my preferred construction, I attain the desired taper of the spring by varying the pitch of the various coils making up the spring, from each end toward its center and in this manner, when the spring is compressed, the center coil will be of a somewhat greater diameter than the end coil. It will thus be apparent that my friction members are preferably tapered from a central point each way. I also preferably form my friction members so that the same may be used interchangeably, or that they may be combined in various units to give various capacities as may be desired.

The preferred embodiment of my invention is shown in the accompanying drawings, in which similar characters of reference designate corresponding parts, and in which:

Figure 1 is a side elevation of my draft gear shown assembled and removed from the rigging, Fig. 2 is a central longitudinal section of the structure shown in Fig. 1, Fig. 3 is an end view of the structure shown in Fig. 1 and looking from the left of the drawing, and, Fig. 4 is a section taken on line 4—4 of Fig. 1, with the spring removed.

In the drawings, I have shown my draft gear as comprising a plurality of sectoral members 1 having contacting friction faces 2 and outside faces $3^a$ and $3^b$ tapered downwardly in both directions from a substantially central point 4. Each friction element is also provided with a projecting lug or shoulder 5 having a tapered wedging face 6. It will be understood that the taper of this face 6 determines the amount of wedging pressure received and it may, therefore, be varied to suit conditions. Encircling the entire assemblage of friction elements 1, is a coiled spring 7 preferably wound from a rectangular or square bar and gradually increasing in pitch from its end coils 8 and 9 to a central point. The end coils 8 and 9 are designed to coact with the wedging faces 6 to produce the desired wedging action and they are, therefore, desirably cut out as at 10 to substantially conform in taper with the faces 6. In order to make the friction faces 2 more active and also to assist in the release of the gear after compression, the contacting faces 2 of each of the friction members 1, are also longitudinally tapered as will be apparent by a comparison of Figs. 3 and 4. Inasmuch as the wedging action is produced by the end coils 8 and 9, and in order to attain the maximum efficiency, it is desirable to positively make these end coils unyielding laterally and I, therefore, weld the end loops to produce annular end coils 8 and 9 of a cylindrical nature.

I will now describe how my draft gear is assembled when a spring is used whose coils gradually increase in pitch toward a central point as above related. It will be noted, by referring to Fig. 2, that the friction members 1 shown in section have their outer tapered surfaces $3^a$, in a substantially horizontal position, which gives the appearance of a tapered lower edge 11. This slight inclining of the members 1, makes the tapered surfaces 3$^a$ of each member lie in contact with the inner flat surfaces of the coils of the spring 7, the edges of whose inner surfaces are preferably rounded as at 7$^a$ to guard against binding. The other outer tapered surfaces 3$^b$ will, therefore, not be in contact with the inner surfaces of the spring, but a pressure upon either end of the assembled gear, will cause a relative movement of the alternately spaced members, whose end lugs 5 are bearing against the cut-out portions 10 of the spring ends. The tapered friction surfaces 2 being in frictional engagement with each other, will cause a wedging between each of the abutting members and, in order to permit movement, the ends of .h member carrying the shoulders 5 must be slightly expanded and since the end coils 8 and 9 of the spring are preferably unyielding, in order to secure the maximum effect, there will be a slight relative movement between the surfaces 6 and 10. This action will continue until the members 1 have moved their full length, in which case the assembled gear will be fully compressed, the lower edges 11 appearing in a horizontal position and the surfaces 3$^a$ and 3$^b$ will taper inwardly in both directions from the central point 4. However, both the surfaces 3$^a$ and 3$^b$ will now be in engagement with the inner friction surfaces of the coils of the spring, since the spring itself will present its inner friction faces in a tapered relation, owing to the gradual increasing of its pitch to a central point when expanded, it being understood that the spring is now substantially fully compressed. It will, therefore, be apparent that each of the friction members has a wedging pressure throughout its entire length and that, therefore, these pressures must be uniformly distributed throughout the entire gear. It will also be seen that I have provided a comparatively simple structure which attains a maximum efficiency primarily because of this uniform distribution of pressure and of adequate friction surface. It will further be apparent that by varying the number of the members 1 and by changing their assembled relation with respect to each other, as for instance, making each two abutting members move in the same direction as opposed to making each abutting member move in opposite directions, as shown, the capacity of my gear may be varied as desired.

What I claim, is:

1. A draw gear and buffing apparatus comprising a plurality of interacting friction members, and a spring for resisting relative movement of said members, said spring having a wedging bearing on all of said members.

2. A draw gear and buffing apparatus comprising a plurality of friction members, and a spring for encircling said members and resisting relative movement thereof, said spring ends being unyielding laterally.

3. A draw gear and buffing apparatus comprising a plurality of friction members, and a spring for normally maintaining said members in release position, said spring ends embracing the ends of said members and being unyielding laterally.

4. A draw gear and buffing apparatus comprising a plurality of longitudinally movable sectors, adjacent sectors being oppositely disposed and in frictional engagement with each other, and a spring pressing adjacent sectors in opposite directions and being in direct wedging engagement therewith.

5. A draw gear and buffing apparatus comprising a plurality of longitudinally movable sectors provided with outer friction faces, adjacent sectors being oppositely disposed and in frictional engagement with each other, and a spring for encircling said sectors, said spring having the inside surfaces of its coils in frictional engagement with said outer friction faces.

6. A draw gear and buffing apparatus comprising a plurality of longitudinal sectors provided with outer friction faces, shoulders on said sectors provided with wedging faces, adjacent sectors being oppositely disposed and in frictional engagement with each other, and a spring for encircling said sectors and being in direct wedging engagement with said wedging faces, said spring having the inside surfaces of its coils in frictional engagement with said outer friction faces.

7. A draw gear and buffing apparatus comprising a plurality of longitudinally movable sectors, adjacent sectors being oppositely disposed and in frictional engagement with each other, shoulders on said sectors provided with wedging faces, and a spring encircling said sectors, the end coils of said spring being in engagement with said wedging faces and being unyielding laterally.

8. A draw gear and buffing apparatus comprising a plurality of longitudinally movable sectors, adjacent sectors being oppositely disposed and in frictional engagement with each other, said sectors being further provided with outer friction faces tapered in both directions from a substantially central point, shoulders on said sectors provided with wedging faces, and a spring encircling said sectors, the end coils of said spring being in engagement with said wedging faces and being unyielding laterally, all of the coils of said springs being normally of gradually increasing pitch toward a central point.

9. A draw gear and buffing apparatus comprising a plurality of friction members, and a spring for encircling said members and provided with friction faces for engagement with all of said members, said spring resisting relative movement of said members.

10. A draft gear and buffing apparatus comprising a plurality of friction members engaging each other frictionally, wedging faces on said members, and a spring for normally maintaining said members in release position and coacting directly with said wedging faces.

11. A draw gear and buffing apparatus comprising a plurality of friction members, wedging faces for said members, and a spring for normally maintaining said members in release position and having friction faces for coaction with said members, said spring also coacting with said wedging faces.

12. A draw gear and buffing apparatus comprising a plurality of friction members having coacting wedging friction faces, said members being also provided with wedging faces, and a spring for normally maintaining said members in release position and coacting directly with said wedging faces.

13. A draw gear and buffing apparatus comprising a plurality of friction members having wedging friction engagement with each other, wedging shoulders on said members, and a spring for normally maintaining said members in release position and having wedging engagement with said shoulders, said spring also having wedging friction engagement with said members.

14. A draw gear and buffing apparatus comprising a plurality of friction members having wedging friction engagement with each other, wedging shoulders on said members and a spring for normally maintaining said members in release position and having wedging engagement with said shoulders.

15. A draw gear and buffing apparatus comprising a plurality of friction members having friction engagement with each other, and a spring for normally maintaining said members in release position and having direct wedging engagement with all of said members.

16. A draw gear and buffing apparatus comprising a plurality of friction members, and a spring for normally maintaining said members in release position, all of said members having friction engagement with each other and with said spring.

17. A draw gear and buffing apparatus comprising a plurality of friction members, and a spring for normally maintaining said members in release position, all of said members having wedging and friction contact with said spring.

18. A draw gear and buffing apparatus comprising a plurality of friction members, wedging shoulders carried by said members, and a spring for normally maintaining said members in release position, said spring having its end coils unyielding transversely and having a wedging bearing on said shoulders.

19. A draw gear and buffing apparatus comprising a plurality of interacting friction members, a spring for normally maintaining said members in release position, and means for causing wedging of said members due to said spring when compressed, said friction members being in contact with the coils of said spring and being tapered in opposite directions from approximately their centers, said spring being correspondingly tapered when under compression.

20. A draw gear and buffing apparatus comprising a plurality of interacting friction members, a spring for normally maintaining said members in release position, and means for causing wedging of said members due to said spring when compressed, said friction members being in contact with the coils of said spring and being tapered, said spring having adjacent coils of gradually increasing pitch to correspond to the taper of said members when compressed.

21. A draw gear and buffing apparatus comprising a plurality of interacting friction members, a spring for normally maintaining said members in release position, and means for causing wedging of said members due to said spring when compressed, said friction members being in contact with the coils of said spring and being tapered in opposite directions from approximately their centers, said spring bearing against said members at each of its ends and having adjacent coils from a central point gradually increasing in pitch to correspond to the taper of said members when compressed.

22. A draw gear and buffing apparatus comprising a plurality of friction members having wedging faces, a spring for normally maintaining said members in release position and being in engagement with the outer friction faces of said members, and transversely unyielding end coils carried by said spring for bearing against said wedging faces, said friction faces in engagement with said spring being tapered in opposite directions, the pitch of said spring gradually increasing toward a central point.

23. A draw gear and buffing apparatus comprising a plurality of tapered friction members, a spring for normally maintaining said members in release position, and means for causing a wedging of said members due to said spring when compressed, said spring having adjacent coils of gradually increasing pitch.

In testimony whereof I affix my signature in presence of two witnesses.

JOHN H. McCORMICK.

Witnesses:
 WALTER E. L. BOCK,
 A. L. PHELPS.